United States Patent [19]

Riedel

[11] 4,323,407
[45] Apr. 6, 1982

[54] ENDLESS PRESSURE BELTS FOR USE IN CONTINUOUS PRESSING AND DECATIZING DEVICES

[75] Inventor: Dieter Riedel, Porta Westfalica, Fed. Rep. of Germany

[73] Assignee: Drabert Sohne Minden (Ger. Body Corp.), Minden, Fed. Rep. of Germany

[21] Appl. No.: 192,327

[22] Filed: Sep. 29, 1980

[30] Foreign Application Priority Data

Sep. 29, 1979 [DE] Fed. Rep. of Germany ....... 2939637

[51] Int. Cl.$^3$ .......................... B32B 31/20; B32B 31/12
[52] U.S. Cl. ....................................... 156/91; 156/164
[58] Field of Search .................................. 156/91, 164

[56] References Cited

U.S. PATENT DOCUMENTS

| | | | |
|---|---|---|---|
| 3,247,038 | 4/1966 | Kraft | 156/164 |
| 3,415,700 | 12/1968 | Webster | 156/164 |
| 3,470,050 | 9/1969 | Michels et al. | 156/164 |
| 3,556,892 | 1/1971 | Hilliard | 156/164 |

*Primary Examiner*—James R. Hoffman
*Attorney, Agent, or Firm*—Penrose Lucas Albright,

[57] ABSTRACT

A method for manufacturing an endless pressure belt for a device for the continuous pressing and decatizing of woven and knitted fabrics and the like. Onto at least one side of an endless fabric made of aromatic polyamide fibres, a synthetic fibre skin is stitched, and one or more layers of rubber, synthetic rubber or the like is pressed at room temperature onto the skin. Subsequently, the structure is vulcanized while longitudinal tension is being applied.

3 Claims, 2 Drawing Figures

ENDLESS PRESSURE BELTS FOR USE IN CONTINUOUS PRESSING AND DECATIZING DEVICES

BACKGROUND OF THE INVENTION

1. Field of the Invention

The invention relates to a method of manufacturing an endless pressure belt for use in a device for the continuous pressing and decatizing of woven and knitted fabrics and the like.

2. Description of the Prior Art

Pressure belts for the above purpose are, while subjected to longitudinal tension, wound around one or more cylinders or one effect roller as well as guide rollers, and exert directly or indirectly a pressure upon the material to be processed. In such pressure belts, in addition to pulling stresses, bending change stresses arise, which are produced by the constant changes between concave and convex bending in the area of the guide rollers.

These pressure belts, which have to be very strong and resistant, are used as pressure-creating members, which press the material to be treated with controllable surface pressure against an effect roller. In this connection, surface pressure values of up to 5.0 kg/cm$^2$ are necessary to bring about the required pressing effect in the material. The pressure belt and effect roller must also be heated up to 120° or 160° C.

In one previously proposed decatizing device, a drive roller provides for the drive of the endless pressure belt, the surface pressure being obtained by a hydraulically-controlled tensioning roller. This decatizing device is better than rotary pressing machines since, because of the synchronous rotation of all rollers, no stretching on pressing occurs in the material. In addition, an about 30-fold pressing area is available, as a consequence of which the action time of the surface pressure, temperature and moisture is 30 times greater than in the pressing process on a rotary pressing machine.

When particularly intensive fixing is required, sufficient moisture must also be available for the pressing operation. This requirement is met by arranging a steaming area in the immediate vicinity in front of the pressing arrangement. The fixing and stabilising of the material then takes place in the area of the surface pressure zone on the circumference of the effect roller. In order that the moisture applied should remain constant also under the temperature change during pressing, the pressure belt must be impermeable. The evaporation process is then inhibited by the impermeable pressure belt, as a result of which a true sweating process develops in the fabric. As the temperatures of the effect roller release fixing effects in the fabric, a fixing sweating process is achieved as opposed to the known tensioning press treatment. Practical tests have shown that particularly in the upper pressure area and at temperatures of 130° C. it is possible to achieve material effects which, at present, can be achieved only by boiler decatizing with the maximum application of pressure.

Therefore, the following demands are made upon the construction of a suitable pressure belt for effecting the described stretch-free fixing and pressing treatment:

(a) the pressure belt must be exceedingly strong and resistant;

(b) the pressure belt must be impermeable; and (c) the pressure belt must be free from marks as surface pressure is applied.

That it is not altogether easy to achieve these aims cumulatively has been evidenced by development work over many years. Tests have also made it clear that, because of the requirement for a smooth, homogeneous surface free from markings, the size of the stretching plays a substantial part. Stretching values of 3% for tensioning loads of 150 kg/cm may not be exceeded, as, otherwise, unsatisfactory changes occur in the surface structure. Stretching values below 3%, however, are achievable only with special materials, such as steel and the like.

However, the use of smooth steel bands must remain out of consideration from the outset as, because of the bending change stresses, the guide rollers of the pressing and fixing device would require a minimum diameter of 1000mm. This is impractical as regards the space required and also the cost. Such belts must be welded so as to be endless which, again, leads to marks on the material at the places of connection.

It has been proposed to use endless pressure belts of steel wire rope fabric which, because of the required nonpermeability, are vulcanised at least on one side. However, such pressure belts have a relatively short working life. The main problem is the vulcanised covering coming loose. The cause of this is to be found in the permanent bending change stresses of the convex and concave bends. Also with this pressure belt construction, the diameters of the guide rollers have to be considerably greater, in order to reduce the loads and in addition also the bending stresses.

The search for workable solutions has returned to pressure belts with textile support members. These are thinner in cross-section and thus are also more elastic at the critical guide places. Because of non-permeability these endless supporting members must also be vulcanised. As a result of vulcanising there arises a first-class impermeable and smooth surface. But these ideal conditions are changed over to their opposite when tensioning loads are required, in which case an "elephant's skin" clearly forms on the mirror surface. These irregularities lead to markings on the material with, as a consequence, an unusable pressing result. In addition, the rubber tends to come off after a relatively short time of use.

SUMMARY OF THE INVENTION

According to the invention there is provided a method of manufacturing an endless pressure belt for use in a device for the continuous pressing and decatizing of woven and knitted fabrics and the like, said method comprising: providing an endless fabric made of aromatic polyamide fibres, stitching a synthetic fibre skin to at least one side of said fabric, pressing at least one layer of rubber at room temperature onto the skin, and vulcanising the structure while longitudinal tension is being applied.

The term "rubber" as used herein, includes not only natural rubber, but also synthetic rubber, butyl rubber and other like materials, which maybe synthetic materials.

Preferably, the polyamide fibres are impregnated with synthetic resins.

First of all an endless fabric is made of aromatic polyamide fibres, for example "Kevlar" or the like, synthetic resin impregnated fibres being appropriately used. To achieve a surface receptive to coating, at the following stage of the process, a synthetic fibre skin is stitched onto at least one side of the endless fabric. This fibre skin provides the contact to the vulcanised-on rubber, synthetic rubber (Kautschuk), butyl rubber or the like, and provides for reliable adherence. The vulcanisation of the above-described endless belt then occurs inside a pressing and fixing machine under special operational conditions, namely with longitudinal traction.

After the endless fabric has been inserted into the pressing and fixing machine, rubber in the form of full width sheets can be applied to the fabric. These sheets are unrolled from a reel and, in a fold-free condition, are pressed onto the fabric by the application of pressure, first of all at room temperature. In such an operation several sheets can be wound one upon the other, and in this manner the endless fabric can be covered throughout its length. Subsequently, an effect roller is brought to the necessary vulcanisation temperature of about 160° C., as a result of which the vulcanisation process is started. The fabric thus presses, under longitudinal tension, the layers of rubber and the like against the hot surface of the effect roller. As the supporting fabric is also heated from below, an effective heat contact is effected from both sides. To achieve the necessary contact time, the fabric runs at an exceptionally low speed.

After several hours of rotational time the vulcanisation process is completed. The rubber surface of the belt which faces the heated effect roller assumes the mirror-polished nature of the surface of the effect roller, while, on the other hand, the rubber layer facing the support member is welded with the fibre skin cover of the support member. As a result of the fact that, on the one hand, the support member develops a very small stretch under load, and that the sheets of rubber or the like are joined with the support fabric when they are already in a stretched condition, no alterations of the surface structure arise during subsequent use — even when the degree of tensioning has been modified.

The flexibility of the relatively thin pressure belt which is produced permits high rotational speeds, without the vulcanised-on layers of rubber and the like coming off.

BRIEF DESCRIPTION OF THE DRAWINGS

The invention will now be further described, by way of example only, with reference to the accompanying diagrammatic drawings, in which.

DESCRIPTION OF THE PREFERRED EMBODIMENT

Figure 1:
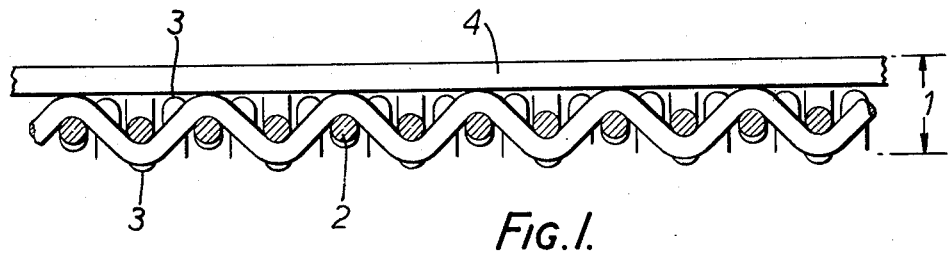
FIG. 1 is a vertical longitudinal section through a pressure belt made in accordance with the invention.

In FIG. 1, 1 denotes the pressure belt which is constructed of an endless fabric 2 of aromatic polyamide fibres as a support member. On at least one side of this support member a synthetic fibre skin 3 is stitched. Onto this skin one or more layers 4 or sheets of rubber, synthetic rubber and the like are pressed at room temperature, and thereupon, the structure thus produced is vulcanised with the application of longitudinal tension.

Figure 2:
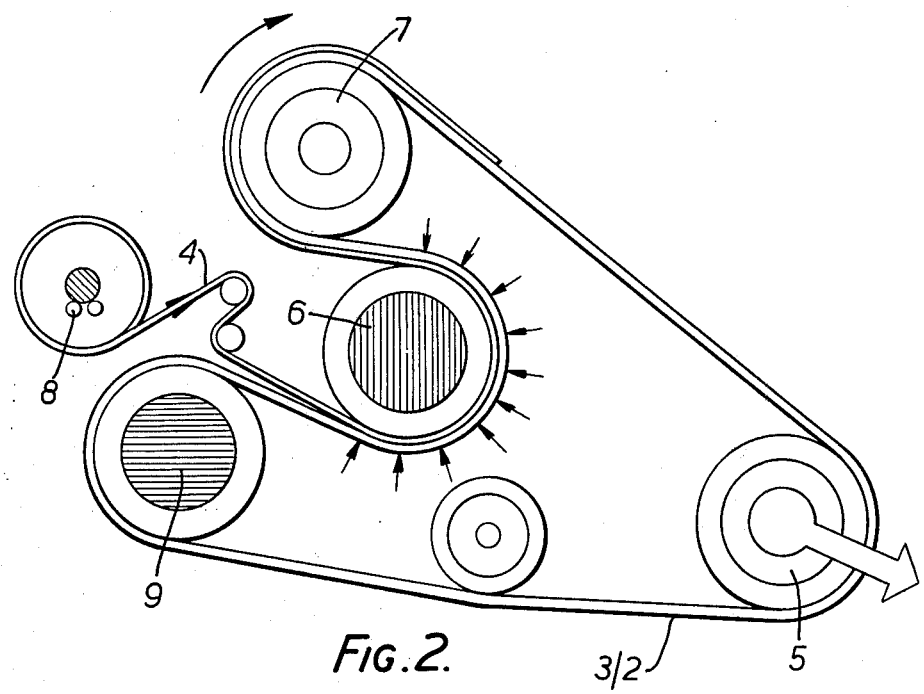
FIG. 2 is a schematic representation of the pressing and vulcanising arrangement.

In this operation, pressing and vulcanisation are effected by means of a pressing and vulcanising arrangement which is schematically represented in FIG. 2 of the drawing.

The endless fabric 2 provided with the fibre skin 3 is tension-loaded by means of a tensioning roller 5, so that a radially-acting surface pressure develops on the periphery of a vulcanising drum 6 (effect roller).

A driving roller 7 provides for the rotation of the fabric 2 provided with the fibre skin 3 and thus also for the rotation of all rollers 5, 9.

The layers or sheets 4 of rubber, synthetic rubber and the like, are unwound to their full width from a reel 8 and pressed, free from folds with the application of pressure — initially at room temperature — onto the fabric 2 provided with the fibre skin 3. In this operation, the several layers or sheets 4 of rubber, synthetic material and the like, are wound one on top of the other, so that in this manner the fabric 2 fitted with the fibre skin 3 is coated throughout its length. Subsequently, the vulcanising drum 6 (effect roller) and the guide roller 9 are heated to about 160° C.

After the drive roller 7 has been adjusted to a creeping speed, the vulcanisation process starts. This lasts several hours and, with operational loading made up of tensioning and bend change loads, this leads to an intimate connection of the parts constituting the pressure belt.

Pressure belts produced by the method described meet all the necessary requirements, namely high strength and resistance, non-permeability and marking-free operation.

What is claimed is:

1. A method of manufacturing an endless pressure belt for use on a device for the continuous pressing and decatizing of woven and knitted fabrics and the like, said method comprising: providing an endless fabric made of aromatic polyamide fibres, stitching a synthetic fibre skin to at least one side of said fabric, pressing at least one layer of rubber at room temperature onto the skin, and vulcanising the structure while longitudinal tension is being applied.

2. A method according to claim 1, wherein the polyamide fibres are impregnated with plastic resins.

3. A method according to claim 1, wherein the rubber is selected from the group consisting of natural rubber, synthetic rubber, and butyl rubber.

* * * * *